(12) United States Patent
Ledevehat

(10) Patent No.: US 8,777,115 B2
(45) Date of Patent: Jul. 15, 2014

(54) CARD SWITCH

(75) Inventor: Yannick Ledevehat, Quebec (CA)

(73) Assignee: Syscard Innovations inc., Québec, QC ( * ) Notice: Subject to any disclaimer, the term of this patent is extended or adjusted under 35 U.S.C. 154(b) by 53 days.

(21) Appl. No.: 13/548,346

(22) Filed: Jul. 13, 2012

(65) Prior Publication Data
US 2014/0014730 A1 Jan. 16, 2014

(51) Int. Cl.
*G06K 19/00* (2006.01)
*H01H 1/10* (2006.01)
*G06K 19/06* (2006.01)

(52) U.S. Cl.
USPC .......................... 235/492; 235/487; 200/512

(58) Field of Classification Search
USPC ............ 235/497–489, 492; 335/205; 200/512
See application file for complete search history.

(56) References Cited

U.S. PATENT DOCUMENTS

| | | | |
|---|---|---|---|
| 4,703,139 A | 10/1987 | Dunlap | |
| 4,916,275 A | 4/1990 | Almond | |
| 5,144,104 A | 9/1992 | Bedoya | |
| 5,399,823 A | 3/1995 | McCusker | |
| 6,109,762 A | 8/2000 | Hallgrimsson et al. | |
| 6,545,239 B2 | 4/2003 | Spedale et al. | |
| 6,556,112 B1 | 4/2003 | Van Zeeland et al. | |
| 7,199,321 B1 | 4/2007 | Huang | |
| 7,252,444 B2 | 8/2007 | Ladouceur | |
| 7,262,762 B2 | 8/2007 | McAlindon | |
| 7,279,652 B2 | 10/2007 | Genz et al. | |
| 7,378,609 B1 | 5/2008 | Fedorjaka | |
| 7,434,735 B2 | 10/2008 | Dean et al. | |
| 7,485,816 B2 | 2/2009 | Ladouceur | |
| 7,687,734 B2 | 3/2010 | Weber | |
| 7,687,735 B2 | 3/2010 | Chien et al. | |
| 7,902,474 B2 | 3/2011 | Mittleman et al. | |
| 7,977,587 B2 | 7/2011 | Rajagopal et al. | |
| 2003/0132301 A1* | 7/2003 | Selker | 235/487 |
| 2004/0026222 A1* | 2/2004 | Adachi | 200/512 |
| 2008/0067247 A1 | 3/2008 | McGregor et al. | |
| 2010/0140072 A1 | 6/2010 | Zieder | |
| 2010/0140359 A1* | 6/2010 | Hamm et al. | 235/488 |
| 2011/0186414 A1 | 8/2011 | Kim et al. | |

FOREIGN PATENT DOCUMENTS

JP 158290 A 7/2009
WO WO 2004/077474 9/2004

* cited by examiner

*Primary Examiner* — Michael G Lee
*Assistant Examiner* — Laura Gudorf
(74) *Attorney, Agent, or Firm* — Norton Rose Fulbright Canada, LLP; Alexandre Daoust

(57) ABSTRACT

There is provided a switch assembly for an electronic card. The switch assembly is mounted within a housing of the card and comprises a switch member adapted to travel axially relative to the housing between a rest position and an actuated position upon application of pressure on the switch member. An actuation member is positioned adjacent the switch member and adjacent an upper face of the housing. Upon exertion of pressure on the upper face, the pressure also applies on the actuation member, thereby displacing the latter. Displacement of the actuation member in turn transfers the pressure to the switch member to move the latter to the actuated position.

11 Claims, 9 Drawing Sheets

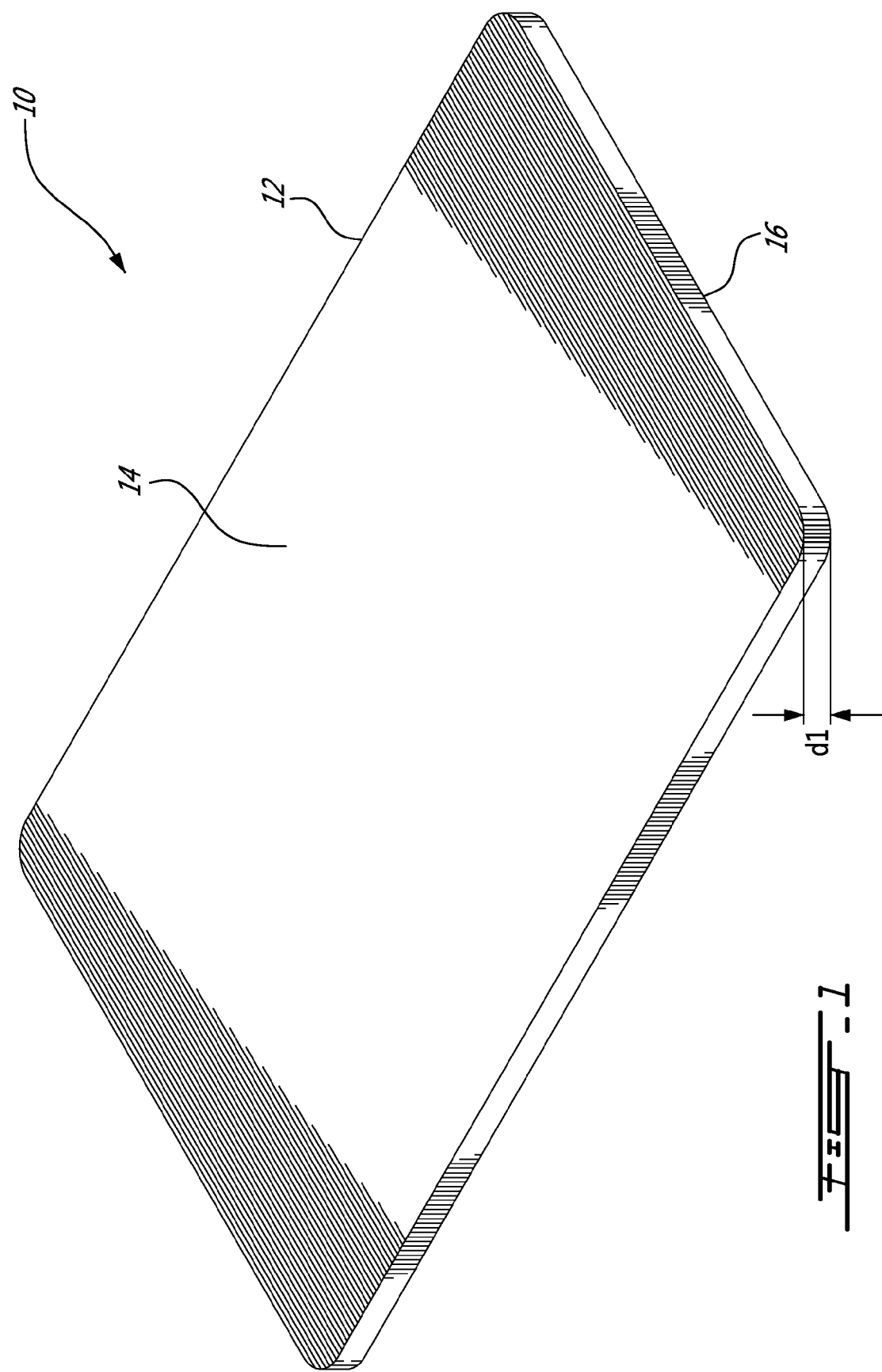

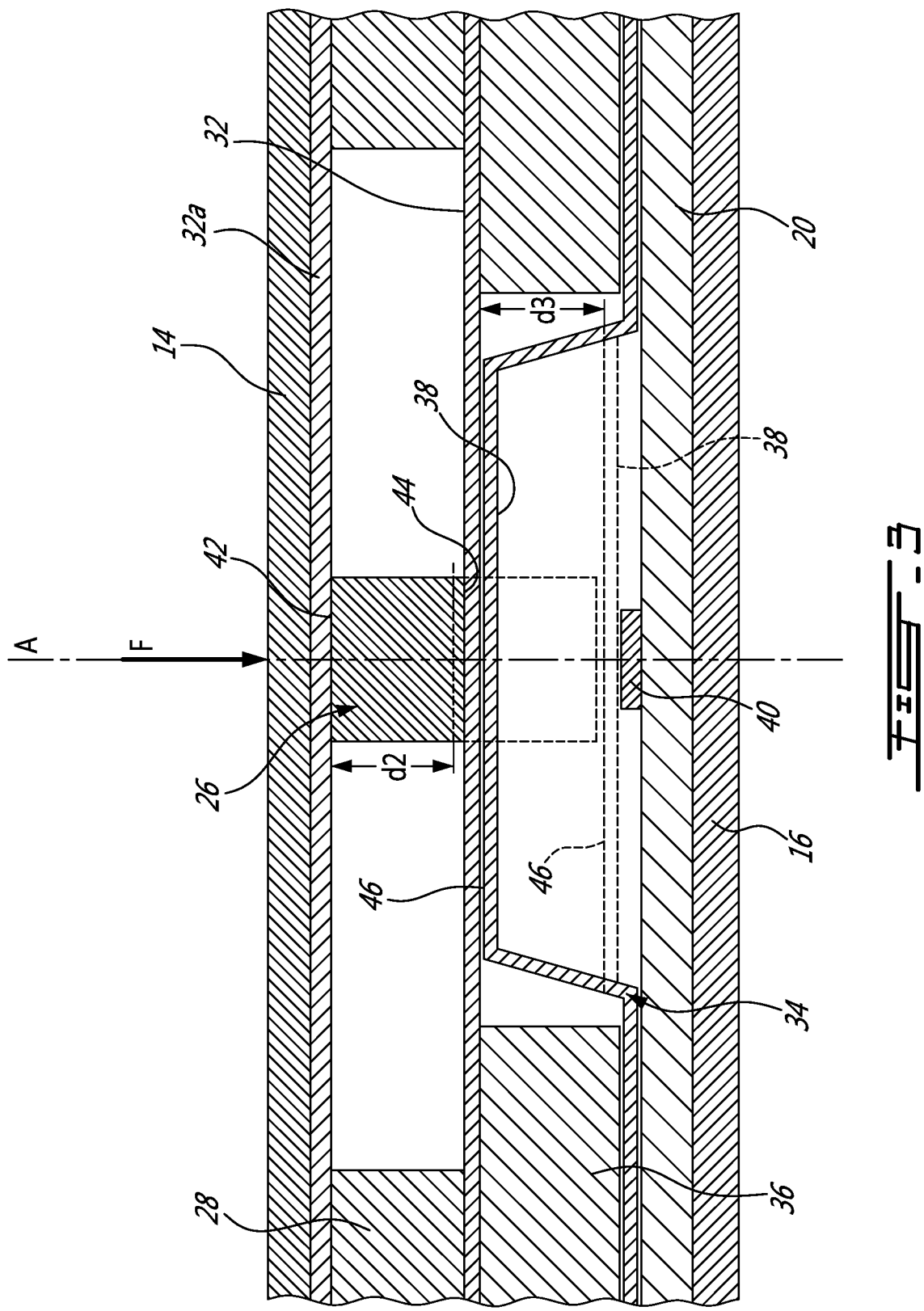

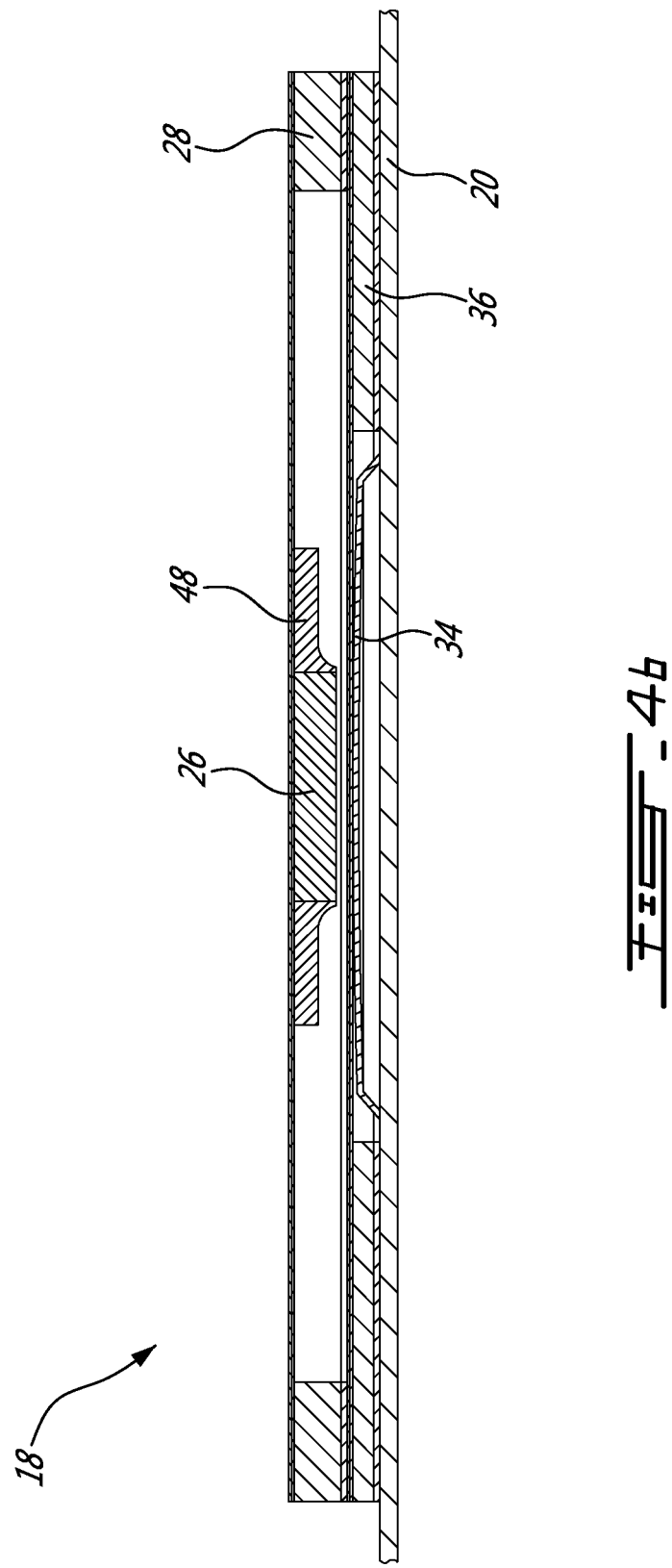

CARD SWITCH

TECHNICAL FIELD

The application relates generally to a switch for an electronic card.

BACKGROUND OF THE ART

When manufacturing an electronic smart card, i.e. a card with electronics such as a smart card for instance and typically provided in the standard width and length dimensions of 85.6×53.98 mm, fillers, such as liquid adhesives, may be used to give structural integrity to the card and secure electronic components within the housing of the card. The card thus forms a particular confined and hermetic environment and although it was highly sought to incorporate switches to such cards, the confined and hermetic environment made it very difficult to do so. Switches incorporated in electronic cards thus began to loose their functionality in card thicknesses approaching 0.8 mm at least partially because the thickness of filler covering the switches increased the pressure threshold required to activate the switch and/or reduced the sensation of feedback to the user once the switch was successfully activated.

Accordingly, there is a need for an improved switch for an electronic card, particularly in the case of electronic cards having a thickness greater than about 0.8 mm.

SUMMARY

In one aspect, there is provided an electronic card comprising a sealed housing having a first surface and a second surface opposite the first surface; a switch member mounted within the housing adjacent the first surface and movable relative to the housing along an axis perpendicular to the first surface between a rest position and an actuated position; and an actuation member mounted within the housing and movable relative thereto along the axis, the actuation member having an actuation surface adjacent the second surface of the housing and a contact surface opposite the actuation surface and adjacent the switch member, wherein, upon application of a pressure on the second surface, the pressure is applied on the actuation surface, thereby displacing the actuation member along the axis with the contact surface exerting the pressure on the switch member and moving the switch member from the rest position to the actuated position.

In another aspect, there is provided a switch assembly for an electronic card comprising a sealed housing having a first surface and a second surface opposite the first surface, the switch assembly comprising a switch member mounted within the housing adjacent the first surface and movable relative to the housing along an axis perpendicular to the first surface between a rest position and an actuated position; and an actuation member mounted within the housing and movable relative thereto along the axis, the actuation member having an actuation surface adjacent the second surface of the housing and a contact surface opposite the actuation surface and adjacent the switch member, wherein, upon application of a pressure on the second surface, the pressure is applied on the actuation surface, thereby displacing the actuation member along the axis with the contact surface exerting the pressure on the switch member and moving the switch member from the rest position to the actuated position.

DESCRIPTION OF THE DRAWINGS

Reference is now made to the accompanying figures in which:

FIG. 1 is a schematic perspective view of an electronic card, in accordance with an illustrative embodiment;

FIG. 2b is an exploded view of the switch of FIG. 2a;

FIG. 3 is a partial schematic cross-sectional view of the switch of FIG. 2a during actuation thereof;

FIG. 4b is a cross-sectional view of the switch of FIG. 4a;

FIG. 5b is a cross-sectional view of the switch of FIG. 5a; and

DETAILED DESCRIPTION

Figure 2A:
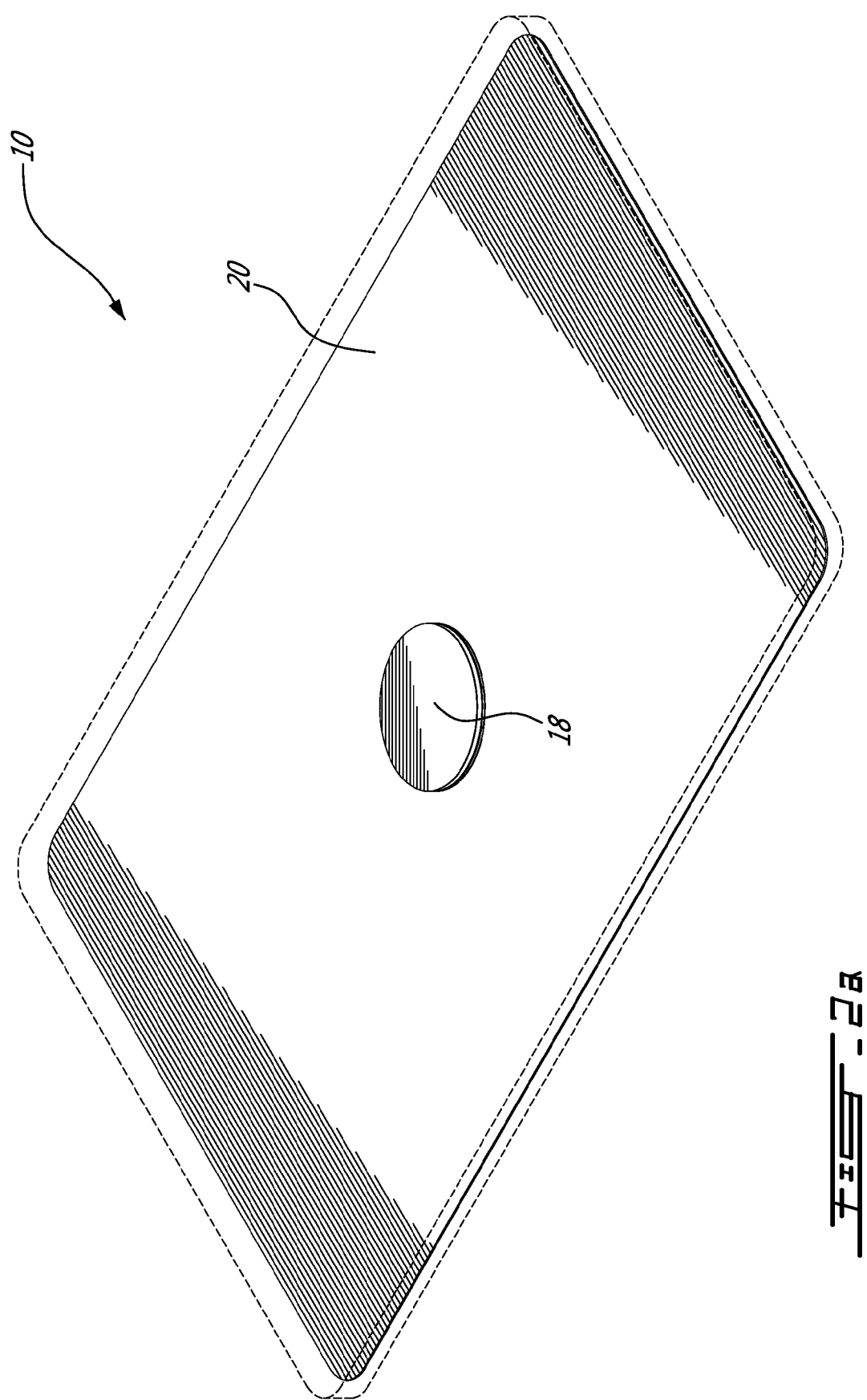
FIG. 2a is a schematic perspective view of the card of FIG. 1 comprising a switch.

Referring to FIG. 1, a pocket-sized electronic card 10 will now be described. The card 10 may comprise electronics used for a variety of purposes where the identity and/or status of a bearer of the card 10 may need to be verified. Applications include cards that may perform measurements and analysis and transmit wireless information. For example, the card 10 may be used to allow personnel to have access to high security areas of a building. In order to provide authentication, a token value, which changes with time, may be used to provide a secure means by which the card holder may access an electronic system. The card 10 may comprise, yet is not limited to, an authenticating voting card, an authenticating financial access card, and a powered game playing card. Although described as related to access control, it should be understood that the card 10 may be used for other applications, such as financial transactions.

The card 10 illustratively comprises a housing 12 enclosing electronic circuitry (not shown) within the card 10. The housing 12 is defined by an upper face 14 and a lower face 16 opposite the upper face 14. The housing 12 may be made of a plastic material, such as polyvinylchloride (PVC) or polyester (PET), a thermoplastic material, or other suitable material known to those skilled in the art. A filler (not shown), such as a liquid adhesive or polyurethane, is housed between the upper and lower faces 14 and 16 for filling the gaps for giving structural integrity and securing electric circuitry components, such as a processor or a power source (not shown), embedded in the card 10. The assembled card 10 illustratively has a thickness d1 (or height, when the card 10 is taken in cross-section) which is greater than 0.8 mm. The thickness d1 is illustratively between one (1) and three (3) mm, and more particularly between 1.2 and 2.5 mm. Each face 14 and 16 further has a thickness between 100 and 200 microns. Due to the dimensional constraints of the card 10, it is desirable for the internal components thereof to be thin and coplanar.

Figure 2B:
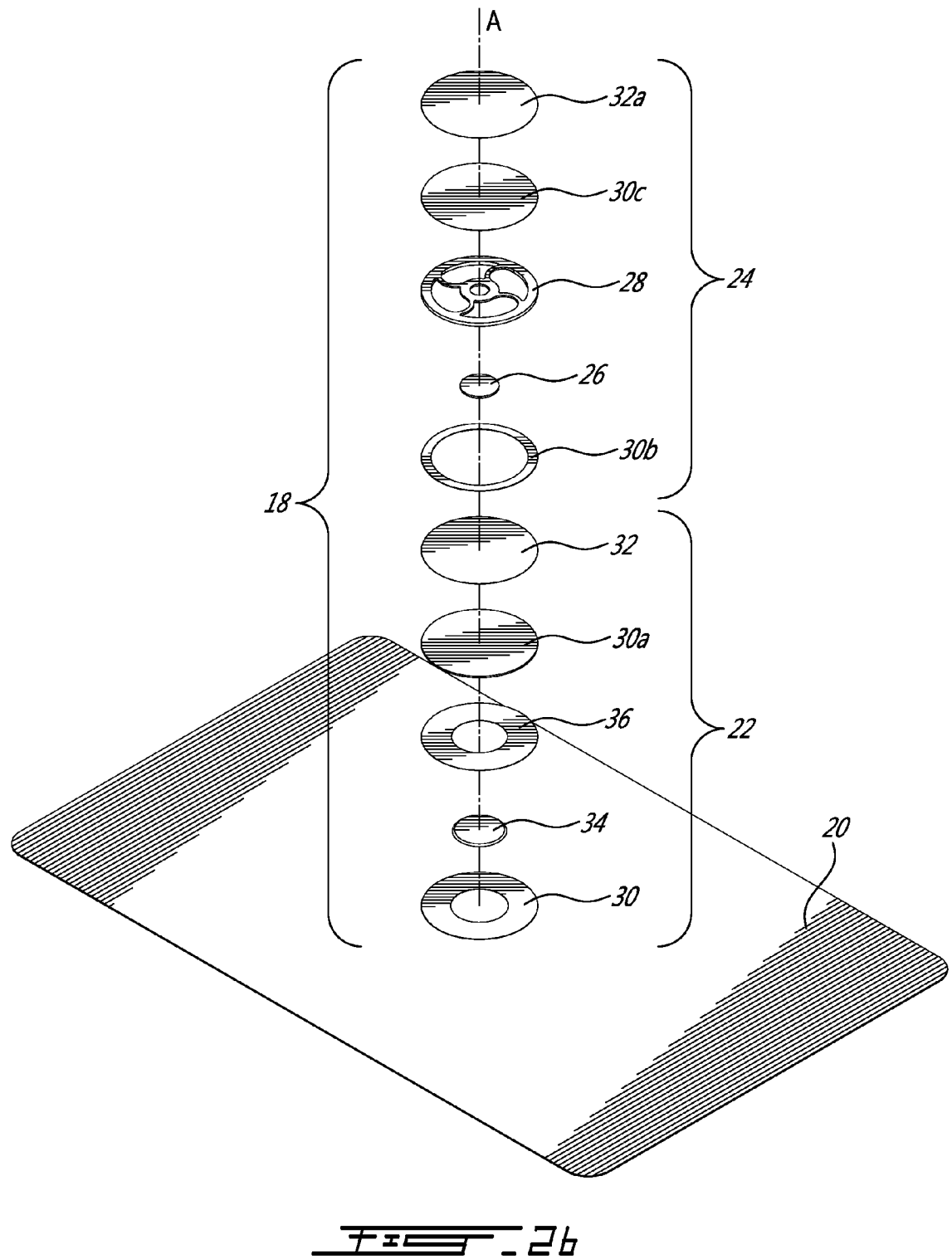

Referring now to FIG. 2a and FIG. 2b, a switch 18 is illustratively provided within the card 10 for activating the electrical circuitry provided therein. The switch 18 is positioned on a Printed Circuit Board (PCB) 20 or other suitable support member housed between the upper and lower faces 14 and 16. The PCB 20 is illustratively positioned adjacent the lower face 16 of the card 10 and has a thickness typically in the range from 50 to 200 microns. The PCB 20 may be provided with conductive electrical traces (not shown) and support various electronic components such as resistors, capacitors, and other suitable components known to those skilled in the art, for facilitating the function of the switch 18.

The switch 18 illustratively comprises a switch member, such as a dome switch 22, a membrane switch, or any other suitable switch known to those skilled in the art, positioned adjacent the lower face 16 of the card 10. The dome switch 22 is activated upon application thereon of pressure exerted along an axis A operatively transverse to the plane of the PCB 20. The switch 18 further comprises an actuation member 24 used for transferring to the dome switch 22 pressure exerted by a user on the card 10, as will be discussed further below. For this purpose, the actuation member 24 comprises a stem 26 and an annular spacer 28 concentric with the stem 26 and spaced therefrom. In order to meet the dimensional constraints of the card 10, the dome switch 22 illustratively has a height between 200 and 500 microns while the actuation member 24 typically has a height between 100 microns and 2 millimeters.

Adhesive layers as in 30, 30a, 30b, and 30c may further be provided for securing the various components of the switch 18 within the housing 12 of the card 10. In order to minimize the overall thickness of the card 10, the adhesive layers 30, 30a, 30b, and 30c illustratively each have a thickness of a few microns. Insulating films as in 32 and 32a may further be used for shielding the dome switch 22 and the actuation member 24 from the liquid adhesive filler housed within the card 10. In particular, the annular spacer 28, together with the films 32 and 32a, and the adhesive layers 30b and 30c seal the stem 26 from the adhesive filler. The films 32 and 32a may be manufactured using plastic or any other suitable material known to those skilled in the art.

FIG. 3 illustrates the operation of the switch 18, with the adhesive layers 30, 30a, 30b, and 30c omitted for sake of clarity. The dome switch 22 of FIG. 2b illustratively comprises a convexity 34, which may be shaped as a dome, and an annular peripheral component 36 surrounding the convexity 34. The peripheral component 36, together with the adhesive layers 30 and 30a of FIG. 2b and the film 32, seal the convexity 34 from the adhesive filler provided within the housing 12. The convexity 34 is illustratively made of metal and has an underside 38 adapted to mate with an electrical contact 40 provided on the PCB 20. When the dome switch 22 is in an unactuated or rest position (shown in solid lines), the convexity 34 is illustratively spaced from the electrical contact 40.

Upon application of downward pressure thereon, the convexity 34 is deformed towards the PCB 20 to actuate the dome switch 22 towards the actuated position schematically shown in dotted lines. In particular, the underside 38 of the deformed convexity 34 connects with the electrical contact 40, thereby completing an electrical circuit. When so actuated, feedback, such as an audible "click" sound or a tactile feedback indicating that the dome switch 22 has been activated, may be provided to the user. It should be understood that the electrical circuit may alternatively be completed when the dome switch 22 is in the actuated position and the convexity 34 is adjacent the PCB 20 by the convexity 34 interconnecting printed circuit strips (not shown) laid out on the PCB 20. In order to enable deformation of the convexity 34 between the unactuated and actuated positions as well as allow recovery over a plurality of activation cycles, the convexity 34 may be made of a resilient and flexible material other than metal, such as polytetrafluoroethylene (PTFE), extended PTFE (EPTFE), or PTFE blends.

It is desirable for the dome switch 22 to be activated by the convexity 34 being displaced over a minimal vertical distance, thus minimizing the height of the convexity 34. Indeed, due to the mechanical constraints of the faces 14 and 16 of the housing 12, activation of the dome switch 22 may prove difficult if a large vertical displacement of the convexity 34 is required to activate the dome switch 22, especially when the diameter of the dome switch is limited such as to fit such a confined available space or to reduce deformation at the face of the card, for instance. The actuation member 24 of FIG. 2b, and more particularly the stem 26, is therefore used to transfer the pressure exerted by the user on the upper face 14 of the card 10 to the dome switch 22. In this manner, the height of the dome switch 22 may be decreased, in turn reducing the displacement distance of the convexity 34. The height of the actuation member 24 may further be varied to adjust to the thickness d1 of the card 10 and minimize the thickness of the adhesive filler provided that may fill the gap between the actuation member 24 and the face 14. In particular, the heights of the annular spacer 28 and of the stem 26 may be selected so that the space between the upper face (not shown) of the actuation member 24 and the upper face 14 of the housing 12 is reduced.

To enable transfer of the pressure to the dome switch 22, the actuation member 24 is freely movable relative to the upper face 14 along the axis A. The upper surface of the actuation member 24, and more particularly the upper face 42 of the stem 26, is positioned adjacent the upper face 14 of the housing 12. A lower contact face 44 of the stem 26 is further positioned adjacent an upper face 46 of the convexity 34, optionally with an insulating film 32 therebetween. In order to move the dome switch 22 from the rest position to the actuated position, a downward force F is applied on the upper face 14 of the card 10 along the direction of axis A. Such a force F may be exerted by pressure from the user's finger (not shown). Due to the adjacent position of the upper surface of the actuation member 24 relative to the upper face 14, the applied force F is also applied to the upper face 42 of the stem 26. As a result, the actuation member 24 travels downwardly in the direction of axis A by a distance d2. The stem 26 is therefore displaced from a first position shown in solid lines to a second position shown in dotted lines. Upon such a displacement, the stem 26 therefore exerts the pressure on the upper face 46 of the convexity 34 to deform the latter. As a result, the convexity 34 is displaced towards the PCB 20 by a distance d3 proportional to the distance d2. The underside 38 of the convexity 34 is thus connected with the electrode contact 40, thereby actuating the dome switch 22.

In order to optimize the operation of the switch 18 and improve the quality of the card 10 as perceived by the user, it may be desirable to reduce the void between the stem 26 and the annular spacer 28 of the actuation member 24. Indeed, such a void may result in unwanted deformations of upper face 14 of the card 10, such as bulges or dents. In addition, reducing the void may reduce the volume of air within the switch 18, thus decreasing the volume of air that the switch 18 may have to compress when moving from the rest position to the actuated position, and thus facilitating activation.

Figure 4A:
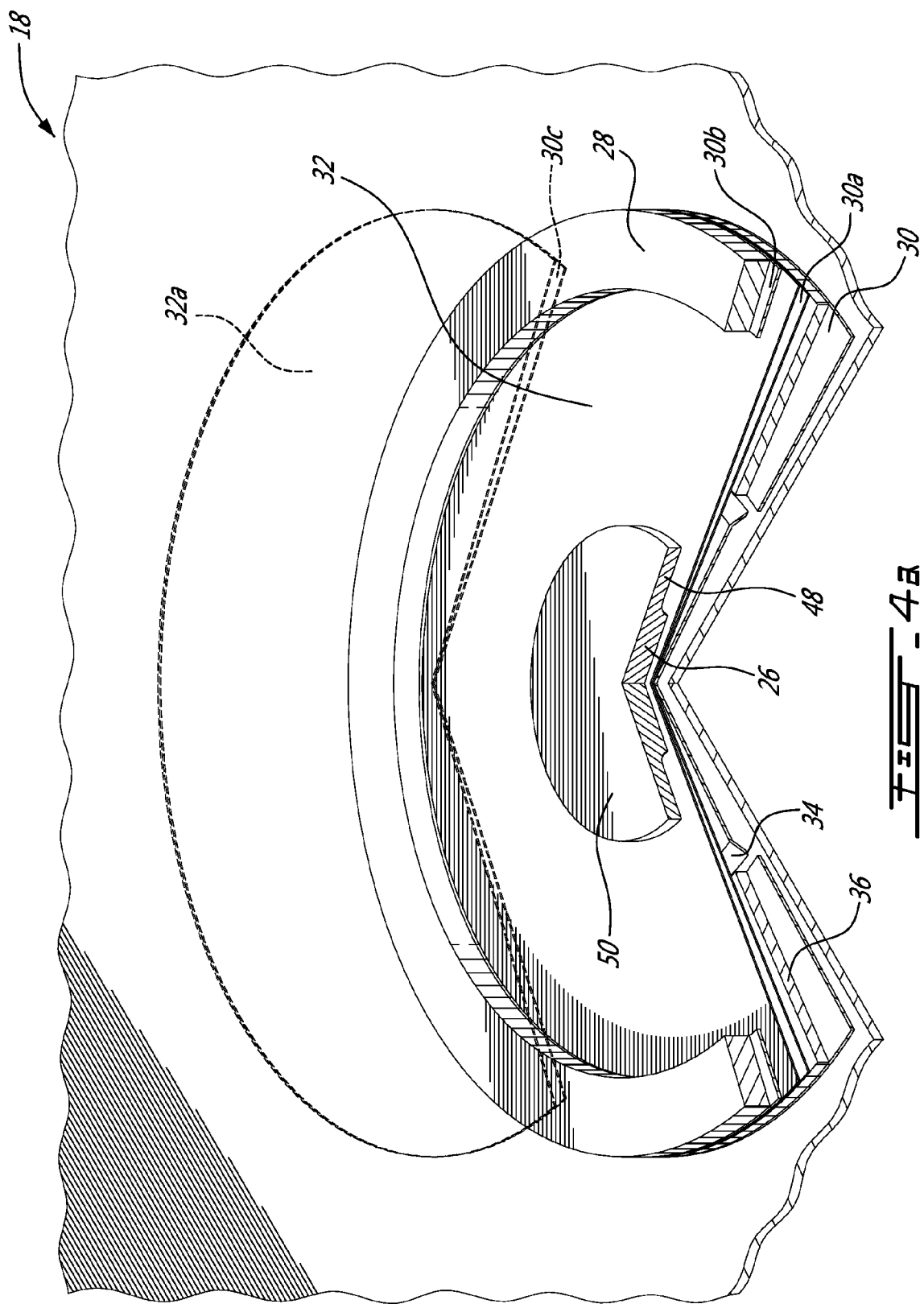
FIG. 4a is a schematic cross-sectional view of the switch of FIG. 2a, in accordance with a first illustrative embodiment.

According to a first embodiment illustrated in FIG. 4a and FIG. 4b, in order to reduce the void between the stem 26 and the annular spacer 28, the stem 26 is surrounded by an annular rim 48. The upper face 42 of the stem 26 and the upper face (not shown) of the rim 48 may be flush and together form an actuation surface 50 sized to receive the pressure exerted by the user's finger on the upper face 14 of the housing 12. In order to enable the pressure applied on the actuation surface 50 to be transferred to the convexity 34 in a localized manner, the diameter of the stem 26 is illustratively smaller than a diameter of the rim 48. The diameter of the stem 26 is further illustratively smaller than the diameter of the convexity 46. As such, the pressure exerted by the user's finger on the upper face 14 of the housing 12 is also applied on the actuation surface 50 for displacing the stem 26 and the rim 48. Upon the stem 26 being displaced, the contact face 44 then exerts the pressure on the upper surface 46 of the convexity 34 optionally through the insulating layer 32. Due to the reduced diameter of the stem 26 relative to the diameter of the actuation surface 50, a pressure broadly applied to the larger actuation surface can be concentrated onto a smaller area of the dome switch. Provision of the rim 48 may further reduce the volume of air neighbouring the actuation member 24, thus facilitating actuation of the switch 18.

Figure 5A:
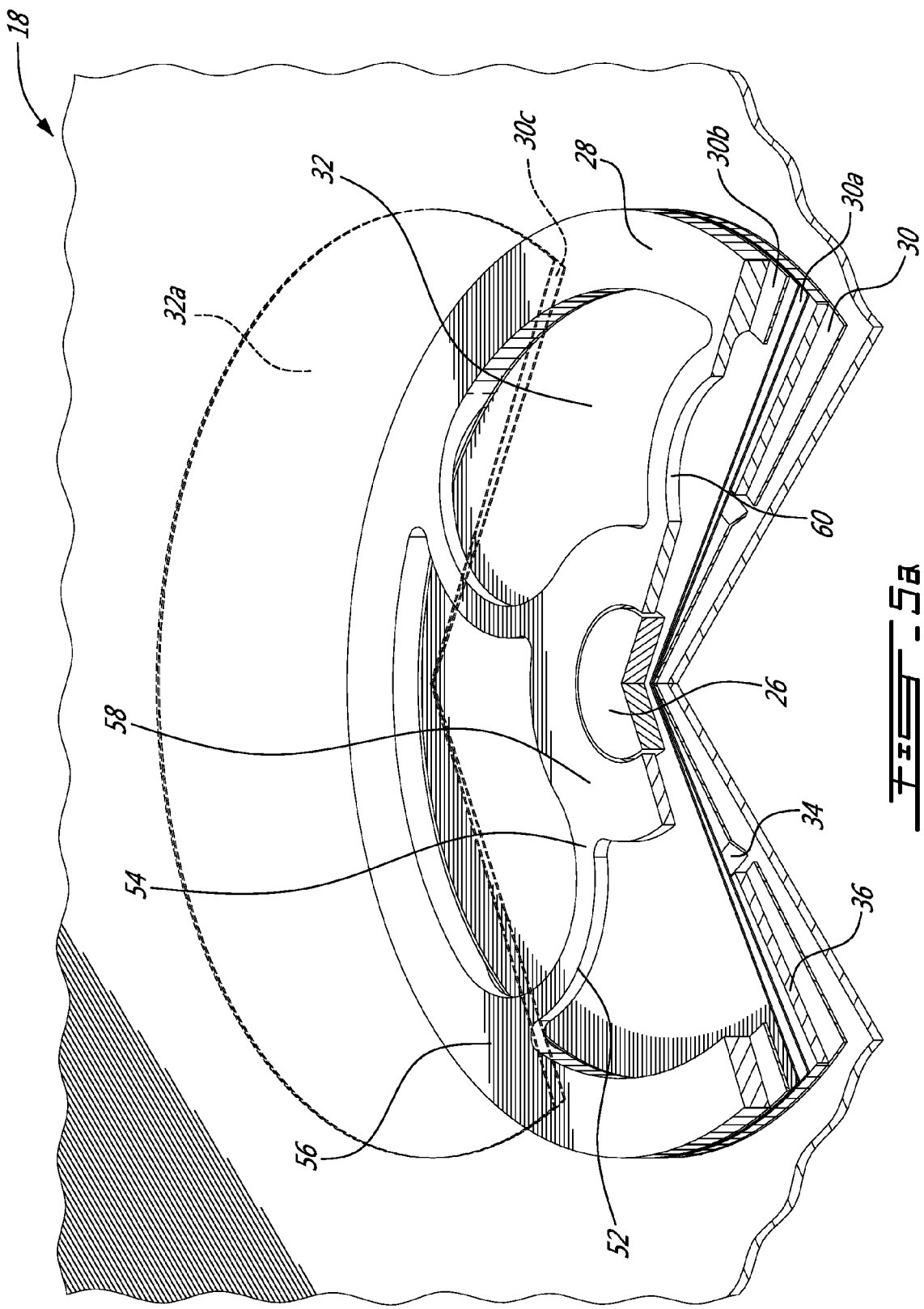
FIG. 5a is a schematic cross-sectional view of the switch of FIG. 2a, in accordance with a second illustrative embodiment.
Figure 5B:
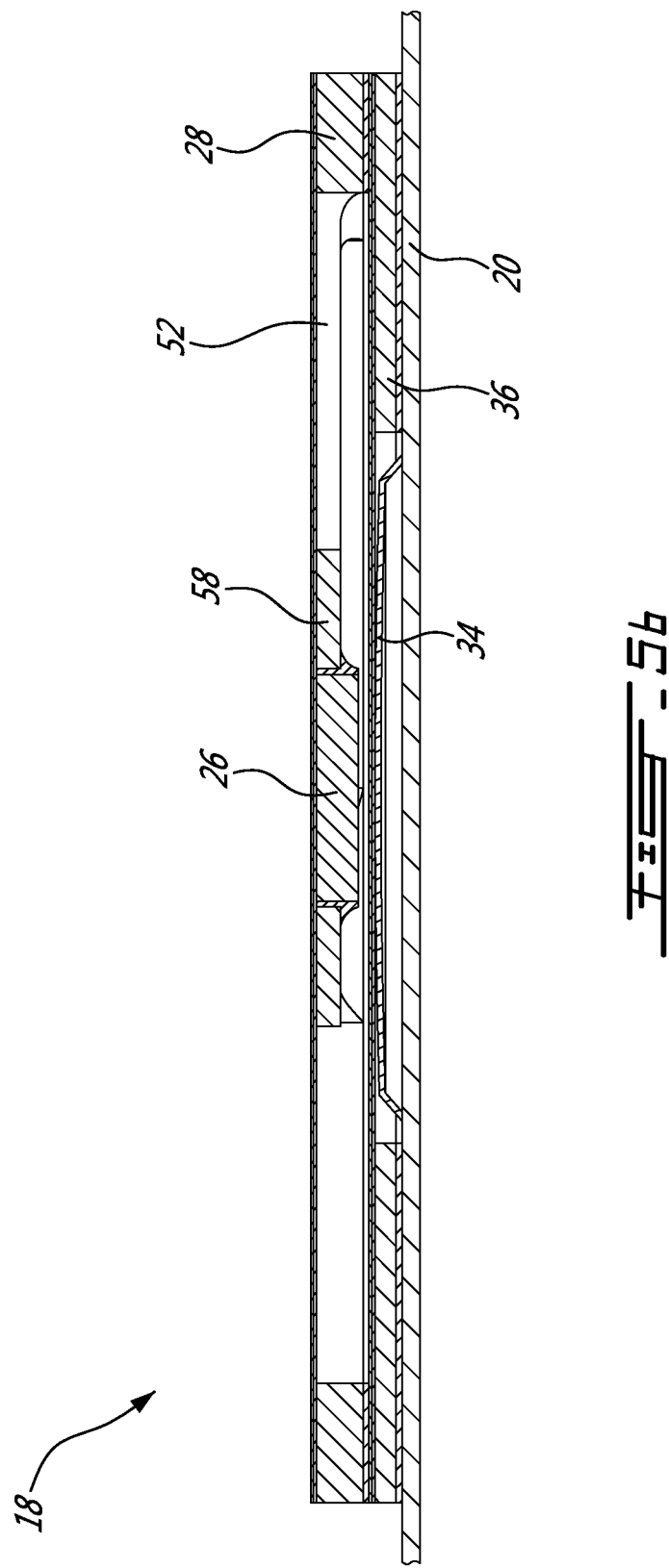

Referring to FIG. 5a and FIG. 5b, according to a second embodiment, a plurality of arms 52 connects the annular spacer 28 to the stem 26 in order to reduce the void therebetween and ease actuation of the switch 18. The arms 52 illustratively extend radially from the stem 26 towards the annular spacer 28 and are circumferentially interspaced. A first end 54 of each arm 52 is coupled to the stem 26 while a second end 56 of the arm 52 is coupled to an edge (not shown) of the annular spacer 28. The ends 56 of all arms 52 may further join into a rim 58 around the stem 26. Such a rim 58 may, similarly to the rim 48, provide an increased actuation surface for application thereon of the pressure from the user's finger as well as a localized contact surface for application of the pressure on the convexity 34.

Although three (3) arms 52 have been shown for illustrative purposes, it should be understood that any suitable number of arms 52 may be used. Still, it should be understood that the number of arms 52 may be selected so as to facilitate actuation of the actuation member 24. For example, if most of the void between the stem 26 and the annular spacer 28 is filled with arms 52, the actuation member 24 may lack flexibility and displacement thereof along the axis A may prove difficult. It may be desirable for at least two (2) arms 52 to be used.

Figure 5C:
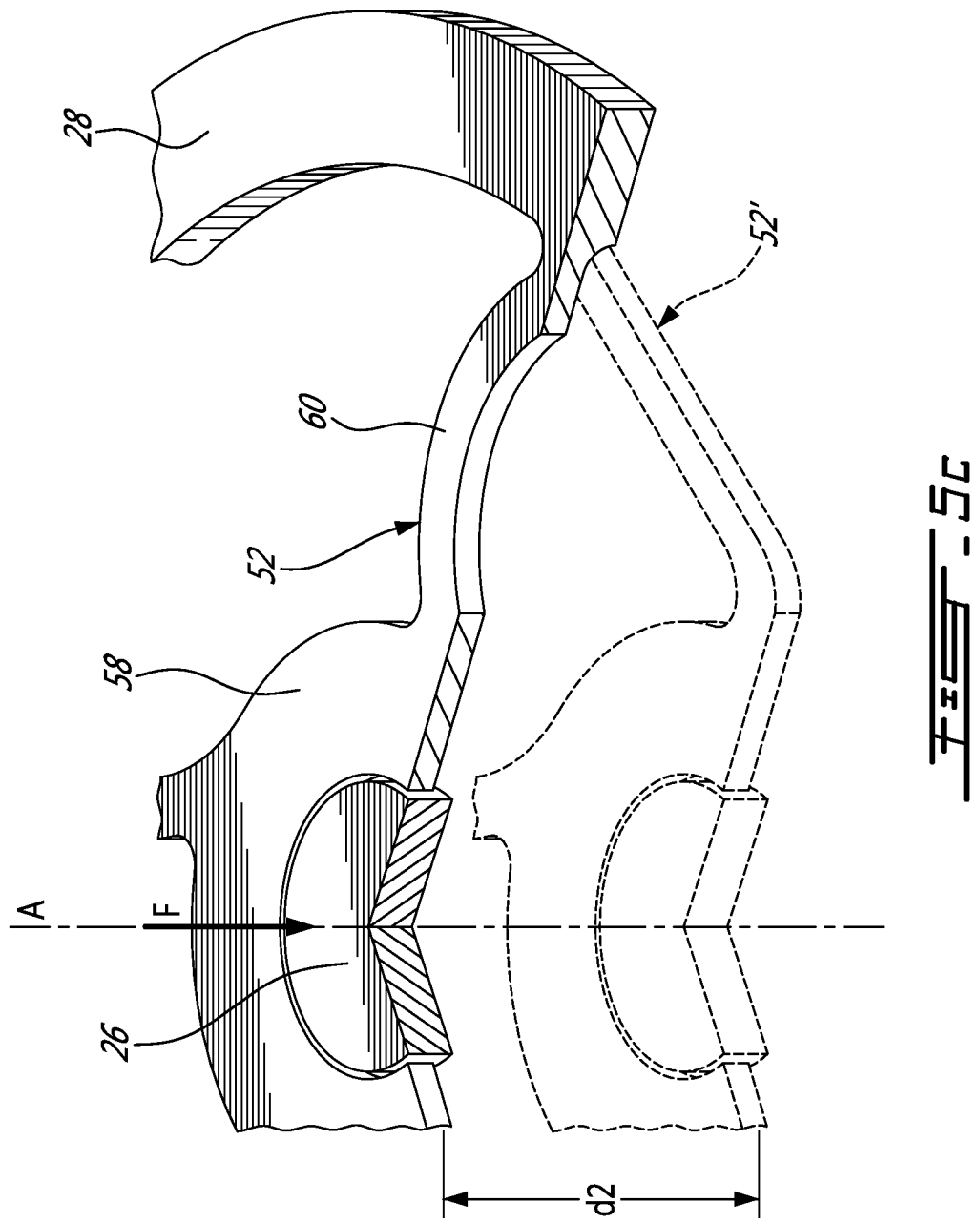
FIG. 5c is a schematic cross-sectional view of an arm coupled to the actuation member of FIG. 2a during a displacement of the actuation member.

Referring to FIG. 5c, as discussed above, the actuation member 24 is displaced upon application of the force F along the direction of axis A between a first position (shown in solid lines) and a second position (shown in dotted lines), in which the stem 26 deforms the convexity 34 towards the PCB 20. As such, it is desirable for each arm 52 to be able to follow the linear displacement of the stem 26 towards the convexity 34. For this purpose, each arm 52 may be made of a resilient material, such as PTFE, EPTFE, or PTFE blends, enabling a deformation of the arm 52. Each arm 52 may also be provided with an arcuate member 60, which may prevent any mechanical resistance to the deformation of the arm 52. In particular, as the stem 26 moves linearly by the distance d2 towards the convexity 34, the arcuate member 60 extends radially to enable the arm 52 to stretch into a configuration 52' for accommodating the travel of the stem 26. In this manner, any resistance to the displacement of the stem 26 is reduced, thus facilitating such a displacement and in turn easing actuation of the switch 18. It should be understood that other means of enabling deformation of the arm 52 may also apply. It should also be understood that the dimensions of the components illustrated in FIG. 5c are not to scale and that the displacement of the actuation member 24 has been exaggerated for clarity purposes.

In the embodiment shown in FIG. 4a and FIG. 4b, the stem 26 and annular spacer 28 are illustratively manufactured as separate components. Provision of the arms as in 52, as per the embodiment illustrated in FIG. 5a, FIG. 5b, and FIG. 5c, alternatively enables manufacturing of the actuation member 24 as a single component comprising the stem 26, the annular spacer 28, and the arms 52 coupling the stem 26 to the annular spacer 28. In addition to providing more flexibility to the actuation member 24, such a configuration thus reduces the costs of manufacturing the actuation member 24, in turn reducing the costs of manufacturing the overall switch 18.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. An electronic card comprising:
a sealed housing having a first surface and a second surface opposite the first surface;
a switch member mounted within the housing adjacent the first surface and movable relative to the housing along an axis perpendicular to the first surface between a rest position and an actuated position; and
an actuation member mounted within the housing and movable relative thereto along the axis, the actuation member having a stem, an annular spacer concentric with the stem and spaced therefrom, a rim surrounding the stem, at least one arm extending radially between the annular spacer and the stem, and an actuation surface adjacent the second surface of the housing and a contact surface opposite the actuation surface and adjacent the switch member, the actuation surface comprising an upper surface of the stem and the contact surface comprising a lower surface of the stem;
wherein, upon application of a pressure on the second surface, the pressure is applied on the actuation surface, thereby displacing the actuation member along the axis with the contact surface exerting the pressure on the switch member and moving the switch member from the rest position to the actuated position.

2. The card of claim 1, wherein the at least one arm is radially deformable for accommodating a displacement of the actuation member along the axis upon application of the pressure.

3. The card of claim 2, wherein the at least one arm comprises a resilient arcuate member enabling the radial deformation of the at least one arm.

4. The card of claim 1, wherein the actuation member comprises a plurality of circumferentially interspaced arms.

5. An electronic card comprising:
a sealed housing having a first surface and a second surface opposite the first surface;
a switch member mounted within the housing adjacent the first surface and movable relative to the housing along an axis perpendicular to the first surface between a rest position and an actuated position; and
an actuation member mounted within the housing and movable relative thereto along the axis, the actuation member having an actuation surface adjacent the second surface of the housing and a contact surface opposite the actuation surface and adjacent the switch member;
wherein the housing comprises an adhesive filler between the first surface and the second surface, the adhesive filler filling a spacing around the switch member and the actuation member;
a first sealing layer positioned between the switch member and the contact surface of the actuation member, and a second sealing layer positioned adjacent the actuation surface of the actuation member, thereby sealing the switch member and the actuation member from the adhesive filler; and wherein, upon application of a pressure on the second surface, the pressure is applied on the actuation surface, thereby displacing the actuation member along the axis with the contact surface exerting the pressure on the switch member and moving the switch member from the rest position to the actuated position.

6. An electronic card comprising:

a sealed housing having a first surface and a second surface opposite the first surface;

a switch member mounted within the housing adjacent the first surface and movable relative to the housing along an axis perpendicular to the first surface between a rest position and an actuated position; and an actuation member mounted within the housing and movable relative thereto along the axis, the actuation member having an actuation surface adjacent the second surface of the housing and a contact surface opposite the actuation surface and adjacent the switch member;

wherein the housing comprises an adhesive filler between the first surface and the second surface, the adhesive filler filling a spacing around the switch member and the actuation member;

wherein a height of the actuation member is selected for minimizing a thickness of the adhesive filler between the second surface and the actuation surface; and wherein, upon application of a pressure on the second surface, the pressure is applied on the actuation surface, thereby displacing the actuation member along the axis with the contact surface exerting the pressure on the switch member and moving the switch member from the rest position to the actuated position.

7. A switch assembly for an electronic card comprising a sealed housing having a first surface and a second surface opposite the first surface, the switch assembly comprising:

a switch member mounted within the housing adjacent the first surface and movable relative to the housing along an axis perpendicular to the first surface between a rest position and an actuated position; and an actuation member mounted within the housing and movable relative thereto along the axis, the actuation member having a stem, an annular spacer concentric with the stem and spaced therefrom, a rim surrounding the stem, at least one arm extending radially between the annular spacer and the stem, an actuation surface adjacent the second surface of the housing and a contact surface opposite the actuation surface and adjacent the switch member, the actuation surface comprising an upper surface of the stem and the contact surface comprising a lower surface of the stem;

wherein, upon application of a pressure on the second surface, the pressure is applied on the actuation surface, thereby displacing the actuation member along the axis with the contact surface exerting the pressure on the switch member and moving the switch member from the rest position to the actuated position.

8. The switch assembly of claim 7, wherein the at least one arm is radially deformable for accommodating a displacement of the actuation member along the axis upon application of the pressure.

9. The switch assembly of claim 8, wherein the at least one arm comprises a resilient arcuate member enabling the radial deformation of the at least one arm.

10. The switch assembly of claim 7, wherein the actuation member comprises a plurality of circumferentially interspaced arms.

11. A switch assembly for an electronic card comprising a sealed housing having a first surface and a second surface opposite the first surface, the switch assembly comprising;

a switch member mounted within the housing adjacent the first surface and movable relative to the housing along an axis perpendicular to the first surface between a rest-position and an actuated position;

an actuation member mounted within the housing and movable relative thereto along the axis, the actuation member having an actuation surface adjacent the second surface of the housing and a contact surface opposite the actuation surface and adjacent the switch member; and a first sealing layer positioned between the switch member and the contact surface of the actuation member, and a second sealing layer positioned adjacent the actuation surface of the actuation member, thereby sealing the switch member and the actuation member from an adhesive filler provided between the first surface and the second surface;

wherein, upon application of a pressure on the second surface, the pressure is applied on the actuation surface, thereby displacing the actuation member along the axis with the contact surface exerting the pressure on the switch member and moving the switch member from the rest position to the actuated position.

* * * * *